(12) United States Patent
Yoshida et al.

(10) Patent No.: US 7,194,588 B2
(45) Date of Patent: Mar. 20, 2007

(54) METHOD FOR REPRODUCING DIGITAL INFORMATION AND DIGITAL INFORMATION RECORDING OR REPRODUCING DEVICE

(75) Inventors: Masanao Yoshida, Osaka (JP); Tsutomu Sasaki, Shijonawate (JP)

(73) Assignees: Sanyo Electric Co., Ltd., Moriguchi (JP); Sanyo Technosound Co., Ltd., Daito (JP)

( * ) Notice: Subject to any disclaimer, the term of this patent is extended or adjusted under 35 U.S.C. 154(b) by 387 days.

(21) Appl. No.: 10/885,075

(22) Filed: Jul. 7, 2004

(65) Prior Publication Data
US 2005/0020383 A1 Jan. 27, 2005

(30) Foreign Application Priority Data
Jul. 8, 2003 (JP) .............................. 2003-193244

(51) Int. Cl.
G06F 12/00 (2006.01)
(52) U.S. Cl. ...................................... 711/154; 711/117
(58) Field of Classification Search ................ 711/113, 711/117, 118, 137, 154
See application file for complete search history.

(56) References Cited

U.S. PATENT DOCUMENTS 5,943,304 A * 8/1999 Kamada et al. .............. 711/111
5,983,319 A * 11/1999 Ito .............................. 711/113
6,272,084 B1 * 8/2001 Maeda .................... 369/47.34
6,839,308 B2 * 1/2005 Kotani .................... 369/47.32
6,996,326 B2 * 2/2006 Koshino et al. ............... 386/47
2003/0081938 A1 * 5/2003 Nishimura et al. ........... 386/52
2003/0120871 A1 * 6/2003 Ayaki et al. ................. 711/137
2003/0200375 A1 * 10/2003 Kawaguchi ................. 710/309
2005/0120148 A1 * 6/2005 Jung et al. .................... 710/29
2006/0004904 A1 * 1/2006 Sarangam et al. .......... 709/200

FOREIGN PATENT DOCUMENTS

JP 8-195031 7/1996

* cited by examiner

Primary Examiner—Hiep T. Nguyen
(74) Attorney, Agent, or Firm—Armstrong, Kratz, Quintos, Hanson & Brooks LLP

(57) ABSTRACT

A method for reproducing digital information includes the steps of: transferring, with a control circuit, information in a hard disk drive to a memory simultaneously with completion of storage of the information in the hard disk drive from outside of a device body, based on the order or type of information to be reproduced, and reproducing the information from the memory. Furthermore, the method includes the step of providing, with the control circuit, a notification to the user that the transfer of the information to the memory is completed by transmitting a signal indicative thereof.

4 Claims, 5 Drawing Sheets

METHOD FOR REPRODUCING DIGITAL INFORMATION AND DIGITAL INFORMATION RECORDING OR REPRODUCING DEVICE

BACKGROUND OF THE INVENTION

1. Field of the Invention

The present invention relates to methods for reproducing digital information, in particular digital audio from devices provided with hard disk drives, and also to digital information recording or reproducing devices.

2. Description of the Related Art

An example of such devices for recording or reproducing digital information is shown in the block diagram of FIG. 4 (see JP H8-195031A).

This is a device for storing digital audio signals transferred either from a CD player and the like via a terminal (19), or from a personal computer (5) (hereinafter, abbreviated as "PC"). Transferring the audio signals from the PC (5) means that, for example, audio signals in a compressed format that have been downloaded from a music server to the PC (5) over the Internet are transferred.

The signals input from the terminal (19) are encoded and compressed by an encoder (6), and stored in a hard disk drive (2) (hereinafter, abbreviated as "HDD"). Usually, audio signals transferred from the PC (5) are already compressed with a format such as MP3 or ATRAC, and do not have to be compressed with the encoder (6). The operation of the HDD (2) is controlled by a control circuit (4), to which operation signals from the user are input.

The control circuit (4) is connected to a memory (3) made up of an SDRAM, and the signals stored in the HDD (2) are also stored in the memory (3). "SDRAM" refers to a DRAM (volatile RAM) that operates synchronously with a clock signal, and an internal clock signal in the control circuit (4) is used as the clock signal. The reason why the device is provided with the memory (3) will be described later.

Signals to be stored in the HDD (2) and the memory (3) are expanded and decoded by a decoder (60), and thereafter output. As shown in FIG. 5, the HDD (2) is provided with a hard disk (20) that is rotated by a spindle motor (M) and a head arm (22) facing the hard disk (20), and a magnetic head (21) is disposed at the tip on the back side of the head arm (22). The HDD (2) has a known structure in which signals are recorded or reproduced by rotating the hard disk (20) to float the magnetic head (21) slightly.

Some of such devices permit the user to input an instruction to reproduce tracks in a desired order to the control circuit (4) while viewing a display (40) connected to the control circuit (4). The control circuit (4) is connected to a RAM (41) and temporarily stores this track order in the RAM (41).

A reproduction procedure in such device is described with reference to the flow chart of FIG. 6. The user has previously stored a plurality of files, in which one file corresponds to one track, in the hard disk (20). When the user turns the power on and pushes a reproduction button (not shown) (S20), the control circuit (4) is activated and initializes, i.e., resets itself (S21). Then, the HDD (2) is activated (S22) and supplies current to the spindle motor (M) to rotate the hard disk (20) (S23) after checking the operation of the peripheral circuits. The control circuit (4) verifies that data are normally readable from the HDD (2) and confirms that the spindle motor (M) is steadily rotating (S24). The control circuit (4) reads initial information (e.g., the size of the stored files) from an area called a system area (not shown) on the hard disk (20) (S25), and the audio signals recorded in the hard disk (20) then become readable.

The control circuit (4) reads the order of files to be reproduced from the RAM (41) (S26) and transmits the order to the HDD (2). Then, the HDD (2) reproduces the files in that order. The reproduced signals are temporarily transferred to the memory (3) (S27), and thereafter output from the memory (3). The audio signals are decoded in the decoder (60) and then converted into analog signals by a D/A converter (61), and thereafter output (S28).

Since the device is provided with the memory (3), in the case of reproducing the same file once again with the power kept on, the reproduction can be performed quickly by reproducing the file from the memory (3) without the need of rotating the hard disk (20).

However, the conventional device has a waiting period of about several seconds to ten seconds from when the reproduction button is pushed to when reproduced sound is output, since it undergoes the above-described steps. Particularly, in the case of using a volatile memory as the memory (3), the content of the memory (3) is erased when the power is shut off. Therefore, a waiting period of about several seconds to ten seconds has been required each time the power is turned on to perform the reproduction.

In this case, the content of the memory (3) can be preserved even after the power is shut off by using a nonvolatile memory as the memory (3). Therefore, reproduction signals become readable from the memory (3) when the power is turned on again, shortening the waiting period. However, a waiting period of about several seconds to ten seconds has been still required when the audio signals are reproduced from the hard disk (20) for the first time in a state in which no reproduction signal has yet been stored in the memory (3).

Regardless of whether the memory (3) is volatile or nonvolatile, a waiting period of about several seconds to ten seconds is similarly required when the audio signals stored in the HDD (2) are reproduced from the PC (5) or the terminal (19) immediately after storage since the audio signals have not yet been stored in the memory (3).

SUMMARY OF THE INVENTION

An object of the present invention is to shorten a waiting period in devices for reproducing digital audio.

A method for reproducing digital information includes the steps of: transferring, with the control circuit (4), information in the hard disk drive (2) to the memory (3) when storage of the information from outside of the device body (1) to the hard disk drive (2) is completed, based on the order or type of information to be reproduced; and reproducing the information from the memory (3).

Furthermore, the method includes the step of: providing, with the control circuit (4), a notification to a user that transfer of the information to the memory (3) is completed by transmitting a signal indicative thereof.

(Operation and Effect)

The control circuit (4) transfers information in the hard disk drive (2) to the memory (3) when storage of the information to the hard disk drive (2) is completed, based on the order or type of information to be reproduced. When the transfer of the information to the memory (3) is completed, the control circuit (4) provides a notification to the user by transmitting a signal indicative thereof. That is, when information is stored in the hard disk drive (2), it is automatically transferred to the memory (3).

In the case of reproducing the information, the information is read from the memory (3) instead of the hard disk drive (2). Since the time and labor of rotating the hard disk (20) are saved, the information is reproduced quickly and the waiting period during reproduction is shortened.

In addition, when the transfer of the information to the memory (3) is completed, the user is notified of this. The user then knows that the device may be disconnected from the PC (5) or a CD player and the like.

For example, when the device is portable, the user may wish to disconnect the device from the PC (5) or a CD player and the like when the transfer of the information to the memory (3) is completed and then to immediately reproduce the information while carrying the device. Therefore, the device is handy for users who carry a device of this sort since they are notified that the transfer of the information to the memory (3) is completed.

DESCRIPTION OF THE PREFERRED EMBODIMENTS

In the following, an example of the present invention will be described in detail with reference to the accompanying drawings.

This example is characterized in that information in the HDD (2) is automatically transferred to the memory (3) simultaneously with completion of storage of audio signals in the HDD (2).

Figure 1:
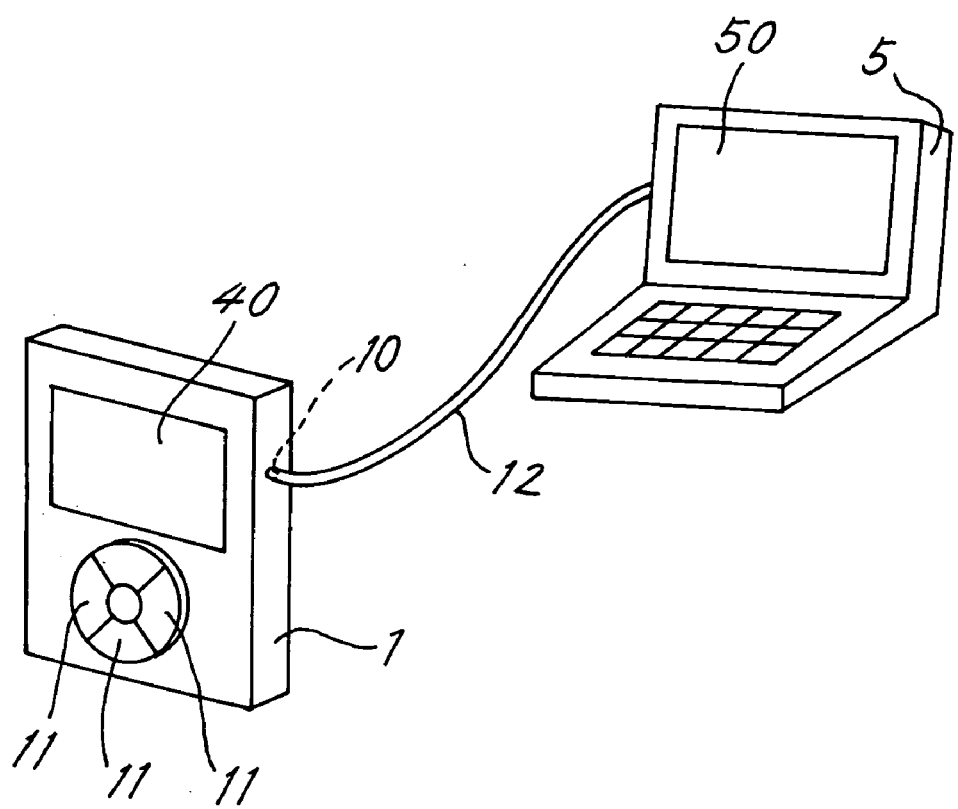
FIG. 1 is a diagram showing how a device body and a PC are connected.

FIG. 1 is a diagram showing how a device body (1) according to the present invention and the PC (5) are connected. A display (40) and a plurality of operation buttons (11) (11) are provided on the device body (1), and the order or type of tracks to be reproduced is displayed on the display (40). The order or type of tracks to be reproduced can be varied by operating the operation buttons (11) on the device body (1).

Figure 4:
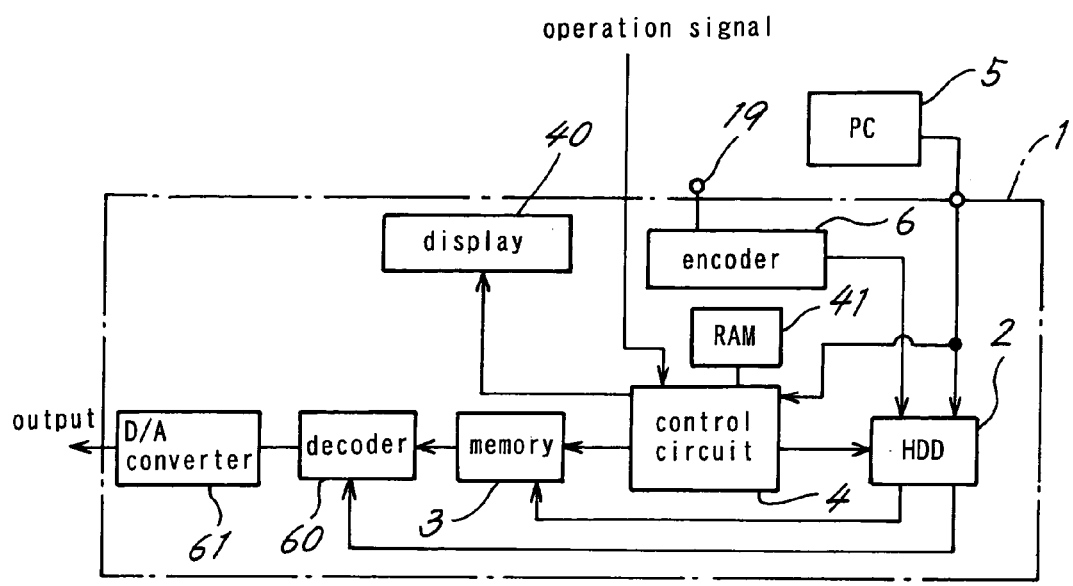
FIG. 4 is a block diagram of the conventional device.
Figure 5:
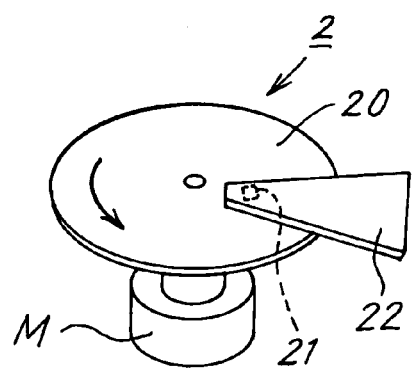
FIG. 5 is a perspective view of a hard disk drive.
Figure 6:
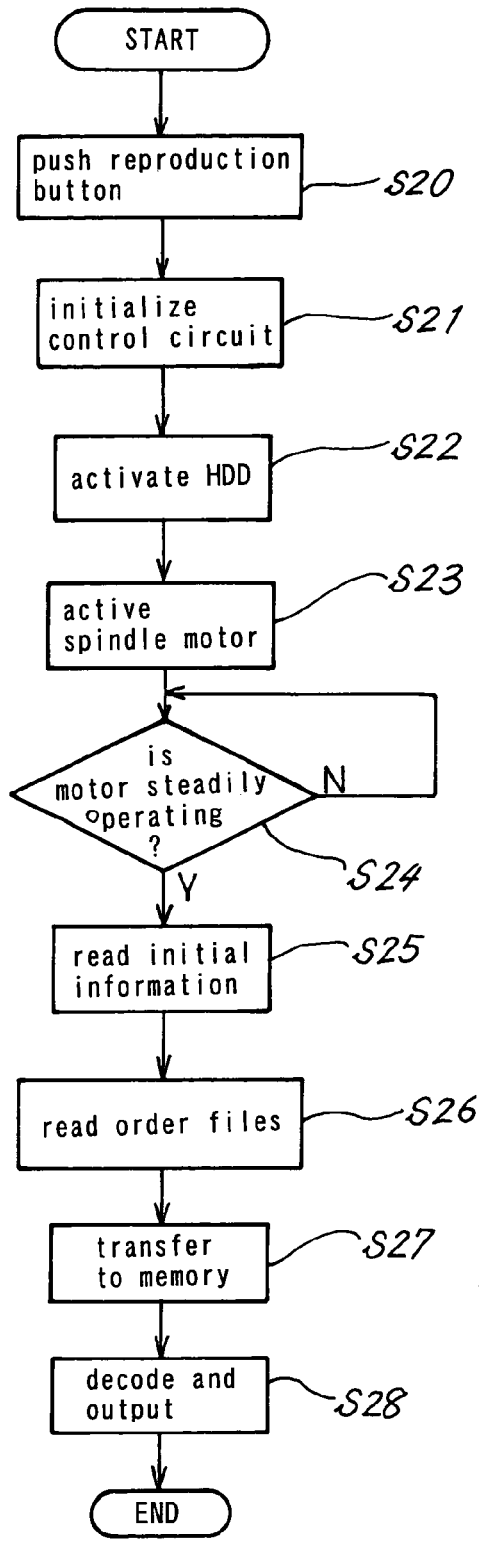
FIG. 6 is a flow chart illustrating the conventional reproduction procedure.

The device body (1) is provided with a cable terminal (10), and one end of a cable (12) can be inserted into the cable terminal (10). The other end of the cable (12) is connected to the PC (5). The configuration of the block diagram of the interior of the device body (1) is similar to that of the conventional device shown in FIG. 4. The HDD (2) and the memory (3) that store audio signals and a RAM (41) that temporarily stores the order or type of tracks to be reproduced are connected to the control circuit (4). The type of tracks refers to, for example, a category such as jazz or classical music. The memory (3) is a nonvolatile flash memory having a capacity of 32 MBytes. As generally known, flash memories are categorized into the NAND type and the NOR type, and the NAND type flash memories are adopted in view of their capacity sizes and data access speeds. It should be noted that the above-described capacity of the memory (3) is merely an example, and the capacity is not limited to 32 MBytes.

Storage in HDD

Figure 2:
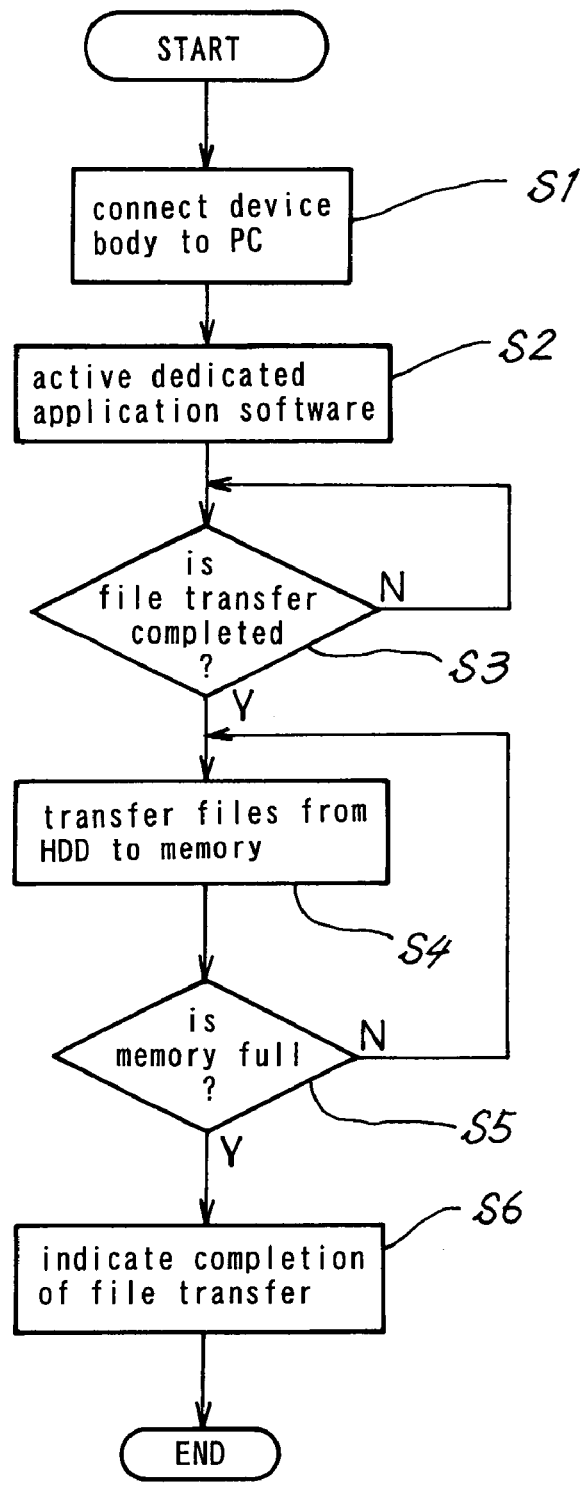
FIG. 2 is a flow chart illustrating a procedure for storing audio signals in a HDD.

In the following, a procedure for storing audio signals in the HDD (2) is described with reference to the flow chart of FIG. 2. A CD-ROM (not shown) is included with the device body (1) as an accessory, and an application software that is activated when audio signals are transferred from the PC (5) to the device body (1) is stored in the CD-ROM. The user has already placed the CD-ROM into the PC (5) and installed the application software on the PC (5). In the RAM (41) of the device body (1), the order or type of the tracks to be reproduced has previously been stored.

After connecting the device body (1) and the PC (5) with the cable (12) (S1), the user turns on the power of the PC (5) and the device body (1) to activate the application software in the PC (5) (S2). Although the HDD (2) in the device body (1) is also activated, there is a waiting period of about several seconds from when the HDD (2) is activated to when a file can be stored, as described above.

A screen (50) of the PC (5) displays the fact that the device body (1) and the PC (5) are connected, as well as a list of the titles, the names of the performers and the like of the tracks, which are the files stored in the HDD (2). When nothing is stored in the HDD (2), then this is indicated on the screen (50). Additionally, the screen (50) also displays a list of the files downloaded to the PC (5).

The user selects files that he or she wishes to transfer from the PC (5), and inputs an instruction to transfer the files to the PC (5). The files in the PC (5) are transferred to the HDD (2) and then stored in the HDD (2) (S3). A command indicating completion of the transfer is attached at the end of the files transferred from the PC (5). When the control circuit (4) detects this command, it ceases to store the files in the HDD (2) after storing the last file, while reading the order of the files to be reproduced from the RAM (41) at the same time.

After erasing the content of the memory (3) once (S4), the control circuit (4) transfers the files stored in the HDD (2) to the memory (3). That is, the files in the HDD (2) are automatically transferred to the memory (3) simultaneously with completion of storage of the files in the HDD (2). When the capacity of the memory (3) is filled (S5) or when the transfer is completed, the control circuit (4) sets a flag indicating completion of the transfer of the files and sends the flag to the PC (5). When the PC (5) confirms this flag, a signal indicating that the transfer of the files is completed and that the cable (12) may be disconnected from the PC (5) is displayed on the screen (50) of the PC (5) (S6).

Since the HDD (2) has a capacity of about several to several tens of gigabytes, which is extremely large compared to the memory (3), not all of the files in the HDD (2) can always be transferred to the memory (3). In this case, it is conceivable to call attention to the user by displaying on the PC (5) the names of the files that were unable to be transferred. Alternatively, it is also possible to temporarily store, the names of the files that were unable to be transferred by the control circuit (4), and to transfer the files that were unable to be transferred when the user erases a part or the whole of the files in the memory (3). Therefore, the HDD (2) is necessary for storing a large quantity of files.

During Reproduction of Files

Figure 3:
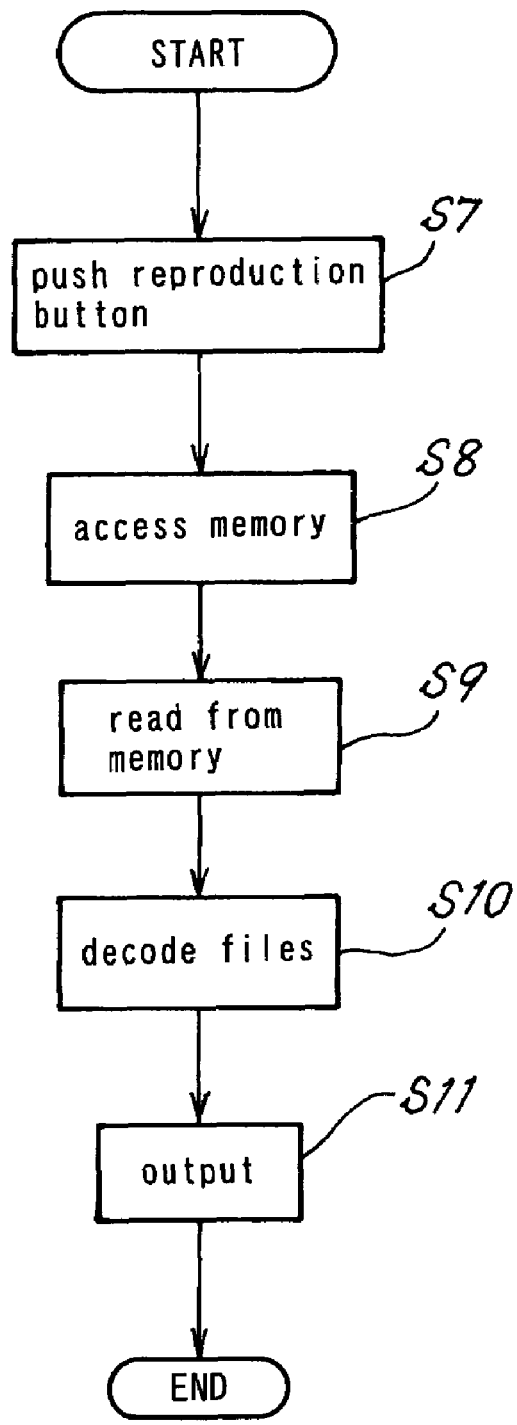
FIG. 3 is a flow chart illustrating a procedure for reproducing files.

A procedure followed during reproduction of files is described with reference to the flow chart of FIG. 3. As described above, files are stored in the memory (3) in the order in which they are to be reproduced, based on the storage content of the RAM (41).

To reproduce the files in the memory (3), the user pushes the reproduction button out of the operation buttons (11) (11) on the device body (1) (S7). The control circuit (4) first accesses the memory (3) (S8), and sequentially reads the files stored in the memory (3) starting with the file stored in the first address in the table of the memory (3) (S9). The read files are decoded and expanded by the decoder (60) (S10), and then converted into analog signals by the D/A converter (61), and thereafter output (S11).

Since the memory (3) is a nonvolatile memory as described above, it preserves the stored content even after the power is shut off. Accordingly, the files can be reproduced from the memory (3) even when the power of the device body (1) is turned off and then turned on again.

Conventionally, files are transferred to the memory (3) at the time of reproducing the files from the HDD (2), so that there has been a long waiting period from when an instruction to reproduce the files is input to when reproduced sound is output.

In the present example, when files are stored in the HDD (2), the files are automatically transferred to the memory (3). In the case of reproducing the files, the files are read from the memory (3) instead of the HDD (2). Since the time and labor of rotating the hard disk (20) are saved, the files are reproduced quickly and the waiting period during reproduction is shortened.

In addition, when the transfer of the files to the memory (3) is completed, the user is notified of this. The user then knows that the device body (1) may be disconnected from the PC (5).

For example, when the device is portable, the user may wish to disconnect the device body (1) from the PC (5) when the transfer of the files to the memory (3) is completed and then to immediately reproduce the files while carrying the device body (1). Accordingly, the device is handy for users who wish to carry a device of this sort since they are notified of completion of the transfer of the files to the memory (3).

The applicant made a trial calculation of the waiting period during reproduction of files from the memory (3), using a NAND type flash memory, Type: TC58256AFT manufactured by TOSHIBA (trademark) as the memory (3).

The waiting period can be calculated in the following two phases:

(1) time period from when the power is turned on to when the memory (3) becomes accessible; and (2) time period required for reading files from the memory (3) and outputting the files, i.e., producing sound.

The time period (1) is about 200 $\mu$s, according to the specifications of the memory (3).

The time period (2) is determined from the processing time during decoding with the decoder (60) since the time period for reading files from the memory (3) is negligibly short. The unit of information decoded by the decoder (60) is 4096 bytes. That is, files are decoded in batches of 4096 bytes from the start of the files. Since it requires 50 ns to process information of one byte (=8 bits) of information, according to the specifications of the memory (3), the time period required for decoding and outputting information of 4096 bytes is calculated as follows.

4096×50 $ns$=204800 $ns$=204.8 $\mu s$

The sum of (1) and (2) is about 400 $\mu$s. Accordingly, the time period from when the power is turned on to when the files are output is 400 $\mu$s, and the time period thus can be shortened compared to the conventional device, in which a waiting period of several seconds to ten seconds has been required.

Although, in the foregoing, a signal indicating that the transfer of the files is completed and that the cable (12) may be disconnected from the PC (5) was described as being displayed on the screen (50) of the PC (5), the signal may be displayed on the display (40) of the device body (1).

Additionally, although the information transferred to the device body (1) was described as being transferred from the PC (5), other digital information including, for example, reproduction signals of a CD player, signals from a digital radio and signals from a cellular phone and the like may also be transferred to the device body (1). In other words, the input device to the device body (1) is not limited to the PC (5). In addition, the files are not limited to audio signals, and may also be video signals.

What is claimed is:

1. A method for reproducing digital information, using a device body comprising: a hard disk drive for storing digital information; a memory for temporarily storing information from the hard disk drive; and a control circuit to which an order or type of information to be reproduced can be input, the control circuit being connected to the hard disk drive and the memory, the method comprising the steps of:

transferring, with the control circuit, information in the hard disk drive to the memory automatically when storage of the information from outside of the device body to the hard disk drive is completed, based on the order or type of information to be reproduced;

reproducing the information from the memory; and providing, with the control circuit, a notification to a user that transfer of the information to the memory is completed by transmitting a signal indicative thereof.

2. The method for reproducing digital information according to claim 1, wherein information in a compressed format is input to the device body from a personal computer, and the notification to a user that transfer of the information to the memory is completed is a display on a screen of the personal computer.

3. The method for reproducing digital information according to claim 1, wherein information in a compressed format is input to the device body from a personal computer, and the notification to a user that transfer of the information to the memory is completed is a display on a screen of the personal computer.

4. The digital information recording or reproducing device according to claim 3, wherein the memory is a nonvolatile memory.

* * * * *